United States Patent [19]

Tamura et al.

[11] Patent Number: 4,685,529
[45] Date of Patent: Aug. 11, 1987

[54] HANDLE POST MOUNTING DEVICE FOR TRACTOR

[75] Inventors: Kazuhisa Tamura; Hideo Watanabe; Akihiro Shimiza, all of Ehime, Japan

[73] Assignee: Iseki & Co. Ltd., Matsuyama, Japan

[21] Appl. No.: 721,864

[22] Filed: Apr. 10, 1985

[51] Int. Cl.4 ............................................ B60D 25/10
[52] U.S. Cl. .................... 180/89.12; 180/90; 180/146
[58] Field of Search ............... 180/89.17, 89.13, 89.1, 180/146, 90, 89.12

[56] References Cited

U.S. PATENT DOCUMENTS 4,312,418  1/1982  Rittman .......................... 180/89.17
4,506,750  3/1985  Leskovec ....................... 180/89.17

Primary Examiner—Richard A. Bertsch
Attorney, Agent, or Firm—Arthur T. Fattibene

[57] ABSTRACT

The present invention relates to a handle post mounting device for a tractor having a hood and a bonnet comprising a central wall having a projected portion formed at the central part thereof toward a backward direction to be engaged with the hood through sealing rubbers on the outer peripheral edge thereof and mounted on body frames at the rear of the bonnet for mounting a handle post therethrough. Thus, hot air flowed from the vicinity of the rear of a bonnet and the right and left sides backwardly can be blocked by the central wall mounted on a body frame and a hood engaged via sealing rubbers with the outer peripheral edge of the wall, thereby improving the residential environment in the vicinity of a driver's seat and obviating the complexity of closing the periphery of a handle post by a complicated conventional blocking plate.

3 Claims, 7 Drawing Figures

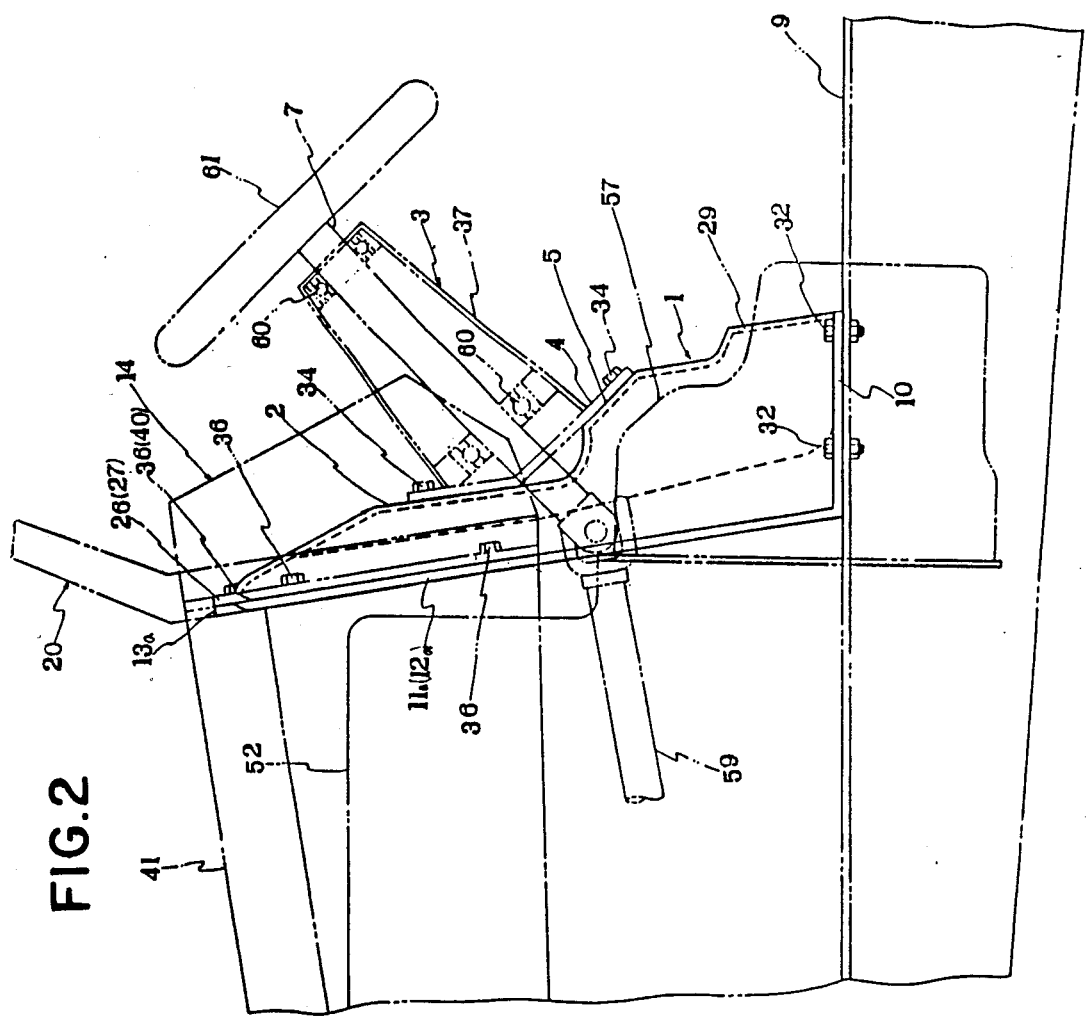

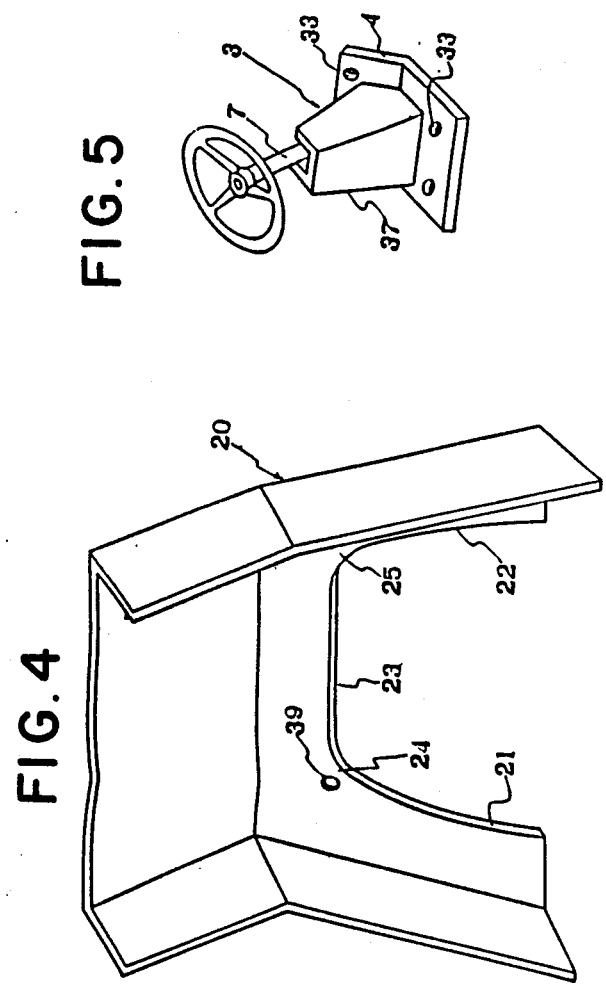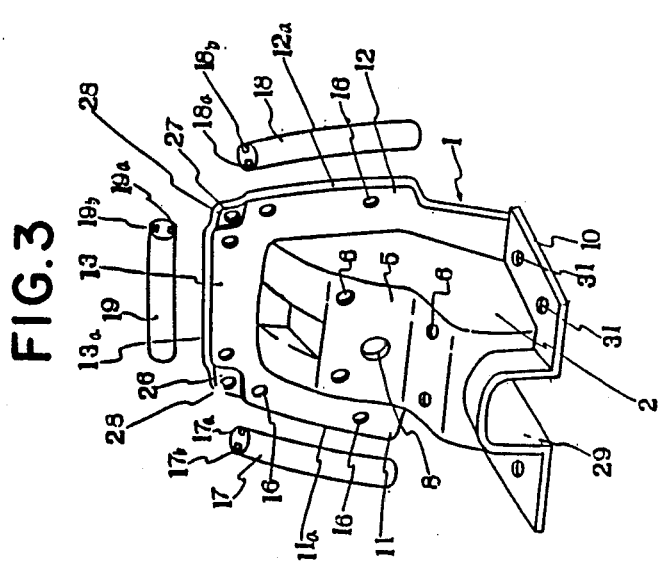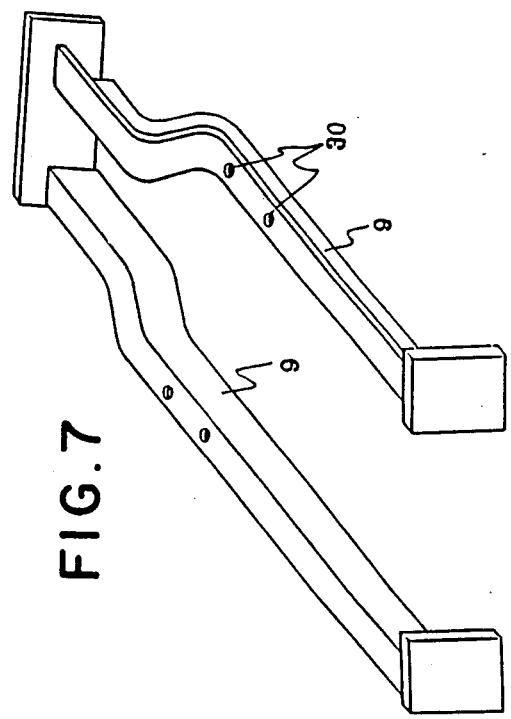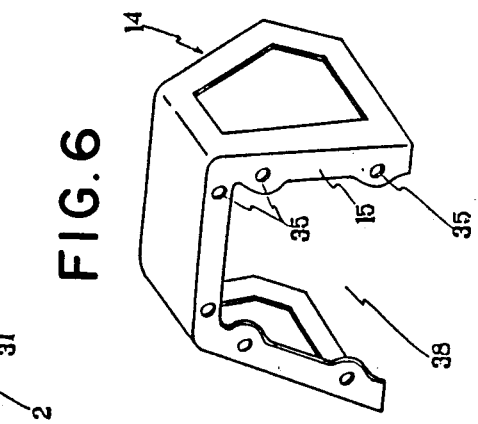

HANDLE POST MOUNTING DEVICE FOR TRACTOR

BACKGROUND OF THE INVENTION (a) Field of the Invention

The present invention relates to a handle post mounting device for a tractor.

(b) Description of the Prior Art

A handle post for journaling a steering wheel or handle shaft as heretofore known, for example, was located on a body frame at the rear of a bonnet for surrounding an engine. In this conventional structure, hot air heated through the periphery of an engine and a radiator is flowed between the rear of the bonnet and the handle post and from the right and left sides of the bonnet backwardly to feasibly deteriorate the residential environment in the vicinity of a driver's seat. For this remedy, there is a conventional structure to close the interval between the rear of the bonnet and the handle post by a blocking plate. However, in this conventional structure, the shape of the blocking plate is complicated, and the mounting of the blocking plate is troublesome, and the hot air from the outside of the bonnet cannot be blocked in this structure. Further, the lower portion of the handle post might inconveniently contact with the rear top of a clutch housing.

SUMMARY OF THE INVENTION

It is, therefore, an object of the present invention to provide a handle post mounting device for a tractor, which can block the hot air flow from the vicinity of the rear of a bonnet and from the right and left sides there of backwardly by means of a central wall mounted on a body frame and a hook engaged via sealing rubbers with the outer peripheral edge of the wall, thereby improving the residential environment in the vicinity of a driver's seat and obviating the complexity of closing the periphery of a handle post by a complicated conventional blocking plate.

Another object of the present invention is to provide a handle post mounting device for a tractor, which can eliminate a danger of causing the lower portion of a handle post to contact the rear top of a clutch housing by mounting the handle post at a central wall and can face the clutch housing with the back surface of a projected portion of the central part of central wall, thereby eliminating the necessity of lowering the elevational position of the clutch housing with respect to a body frame.

Still another object of the invention is to provide a handle post mounting device for a tractor, which can relatively freely select the mounting position of an engine and a clutch housing, thereby improving the rigidity of a central wall by the swelled portion of the central wall.

According to an aspect of the present invention, there is provided a steering wheel or handle post mounting device for a tractor having a hood and a bonnet comprising a central wall having a projected portion formed at the central part thereof toward a backward direction to be engaged with the hood through sealing rubbers on the outer peripheral edge thereof, and mounted on body frames at the rear of the bonnet for mounting a handle post therethrough.

The above and other objects of the invention will be apparent by those skilled in the art from a reading of the following detailed description of the disclosure found in the accompanying drawings and novelty thereof pointed out in the appended claims.

BRIEF DESCRIPTION OF THE DRAWINGS

FIG. 2 is an enlarged view of the essential portion of the tractor in FIG. 1;

FIG. 3 is a perspective view of a central wall in an embodiment of a handle post mounting device for a tractor according to the present invention;

FIG. 4 is a perspective view of a hood in the tractor;

FIG. 5 is a perspective view of a handle post of the tractor;

FIG. 6 is a perspective view of a meter panel mounting frame of the tractor; and FIG. 7 is a perspective view of body frames to be mounted with the central wall of the handle post mounting device of the invention.

DETAILED DESCRIPTION OF THE PREFERRED EMBODIMENTS

Figure 1:
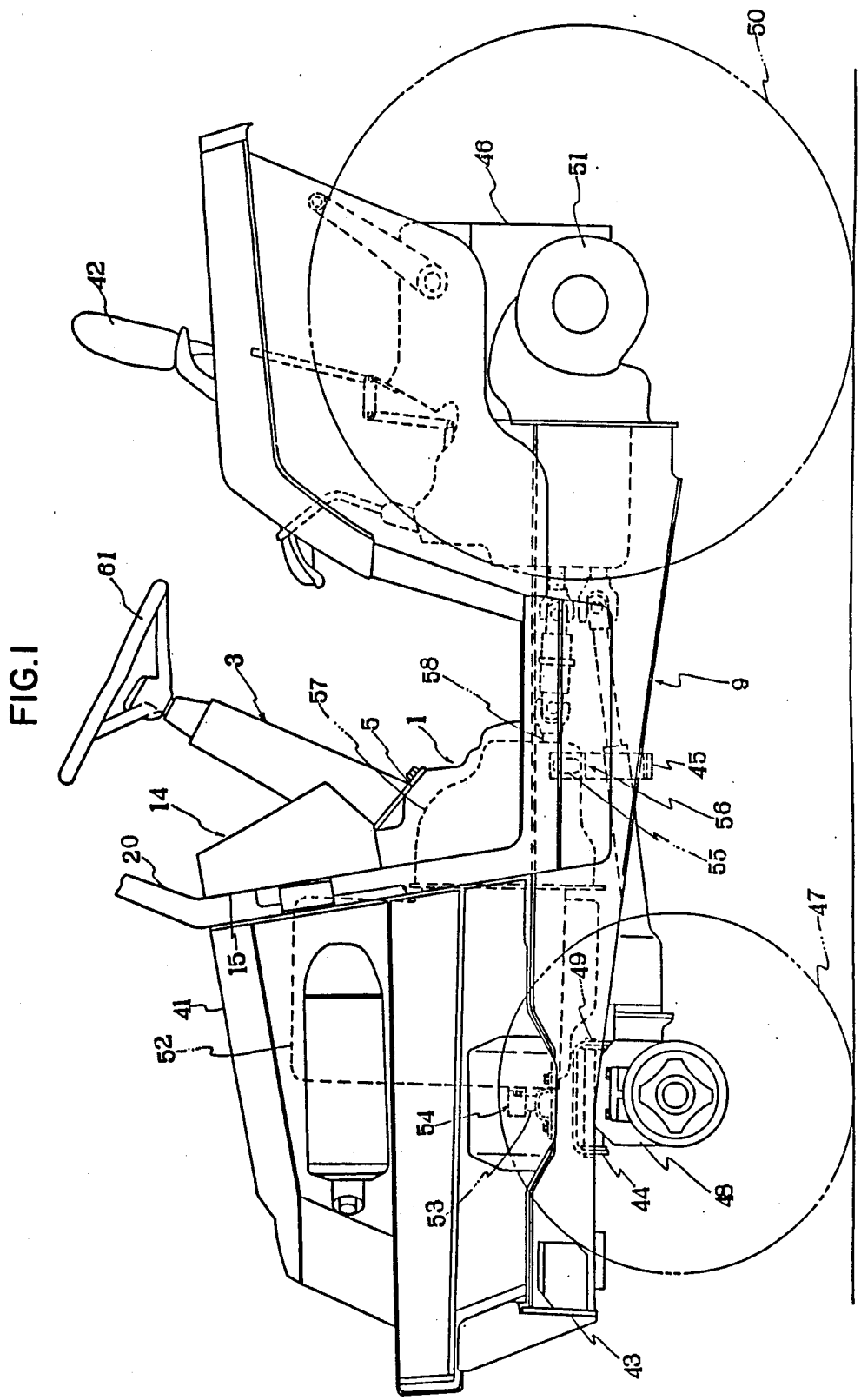
FIG. 1 is a side view of a tractor.

An embodiment of the present invention will now be described in detail with reference to the accompanying drawings.

A central wall or housing 1 of a handle post mounting device of the invention, as shown in a side view of the steering wheel or mounting state in FIG. 2 and in a perspective view of FIG. 3, has opposed projected side portion 2 projecting backwardly in the mounted state in the vicinity of a central part. The central wall 1 has at the projected portion 2, a mounting seat 5 for receiving the mount or mounting portion 4 of a handle post 3 as shown in FIG. 5. Bolt holes 6, 6, ... and an inserting hole 8 for receiving the lower portion of a handle shaft 7 are located on the mounting seat. The central wall 1 further has at the lower portion thereof mounting legs or outwardly turned flanges 10 for mounting the housing 1 on right and left body frames 9 and 9 exemplified or shown in FIG. 7. At the left and right sides 11 and 12 and at the top 13, bolt holes 16 and 16 for joining the mount 15 of a meter panel mounting frame 14 are shown in a back perspective view in FIG. 6. At the outer peripheral edges 11a, 12a, 13a of the left or right sides 11 and 12 and top 13 are hoinging portions 26 and 27 with bolt holes 28, 28 for connection with the back surfaces of the inner peripheral edges 21, 22 and 23 of the hood 20. Seal means are located at the joining portions 26 and 27 of the corners with the inner peripheral edges 21, 22 and 23 of the hood 20 so that the peripheral edge 11a, 12a and 13a engaged with the inner grooves 17a, 18a and 19a of sealing rubbers 17, 18 and 19 in such a manner that the inner peripheral edges 21, 22, 23 of the hood 20 exemplified in FIG. 4 are respectively engaged with the outer grooves 17b, 18b and 19b of the sealing rubbers 17, 18 and 19. An opening 29 is formed at the lower part of the projected portion 2 of the central wall 1.

Bolt holes 31, 31 of the mounting legs 10 of the central wall 1 are brought into coincidence with the bolt holes 30, 30 of the body frames 9, 9, and the legs 10 are respectively mounted by bolts 32, 32 at the frames 9, 9. The bolt holes 33, 33 of the mount 4 of the handle post 3 are brought into coincidence with the bolt holes 6, 6 of the mounting seat 5 of the central wall 1, and the handle post 3 is mounted at the wall 1 by bolts 34, 34. The bolt holes 35, 35 of the mount 5 of the meter panel mounting frame 14 are brought into coincidence with the left and right sides 11, 12 of the central wall 1 and the bolt holes 16, 16 of the top 13, and the frame 14 is mounted at the central wall 1 by bolts 36, 36. Thus, part of a shaft supporting cylinder 37 of the handle post 3 is penetrated through the central hole 38 of the meter panel mounting frame 14. Further, the lower portion of the handle shaft 7 is movably inserted into the hole 8 of the central wall 1, and the lower portion of the handle shaft 7 is coupled through a universal joint to the transmission shaft 59 of a front wheel steering mechanism, which can be steered by rotating the steering handle 61 of the handle shaft 7 journaled by bearings 60, 60 to the shaft supporting cylinder 37.

The inner grooves 17a, 18a, 19a of the sealing rubbers 17, 18, 19 are respectively engaged with the outer peripheral edges 11a, 12a, 13a of the central wall 1, the inner peripheral edges 21, 22, 23 of the hood 20 are respectively engaged with the outer grooves 17a, 18a, 19a of the sealing rubbers 17, 18, 19, the joining portions 24, 25 of the hood 20 are respectively jointed with the joining portions 26, 27 of the wall 1, and the hood 20 is mounted at the wall 1 by bolts 40, 40 inserted into the bolt holes 39, 39 of the joining portions 24, 25 and the bolt holes 28, 29 of the joining portions 26, 27. The central wall 1 and the hood 20 are disposed at the rear of the bonnet 41. The hood 20 is further disposed at the left and right outsides, and the top from the left and right sides and the top of the bonnet 41. Thus, the hot air flowed from the rear, the right and left outsides of the bonnet 41 backwardly is blocked by the hood 20 to eliminate the hot air to flow to the vicinity of the driver's seat 42. Then, a window glass is engaged at the suitably position of the hood 20, or a transparent hard synthetic resin is used to allow the good forward visibility.

The body frames 9 and 9 are coupled to each other through a lateral beam 43, a front axle bracket 44, and a lateral beam 45. The rear ends of the frames 9, 9 are bolted to a transmission case 46, a front axle 48 for journaling front wheels 47, 47 is pivotally secured to the bracket 44 by a center pin 49 so that the right and left sides of the axle 48 can elevationally fluctuate, and a rear axle 51 journaled with right and left wheels 50, 50 is mounted at the rear right and left sides of the transmission case 46.

An engine 52 is supported through supports 54, 54 having vibrationproof members 53, 53 at the front and supports 56, 56 having vibrationproof members 55, 55 at the rear to the body frames 9, 9. The rear of a clutch housing 57 mounted at the rear of the engine 52 is faced with the back surface of the projected portion 2 of the central wall 1, and the rear top of the housing 57 is exposed from the opening 29 of the central wall 1. Thus, the exposed portion of the clutch housing 55 is covered by a cover 58. It is noted that the shape of the hood 20 and the number of the sealing rubbers 17, 18 of the central wall 1 may be variably provided in addition to the exemplified embodiment as shown.

What is claimed is:

1. A handle post mounting device for a vehicle having a bonnet enclosing an engine and a hood (20) comprising
   a central wall (1) having opposed projected portions (2—2) formed at the central part thereof directed in a rearward direction whereby an upper portion is positioned forwardly and a lower portion directed rearwardly to define forwardly tilted housing, adapted to connect with the hood (20),
   sealing means circumscribing the peripheral portions of the central wall, for sealing the connection between said central wall and the hood (2),
   a body frame (9), and
   means (10) connected to said central wall (1) for mounting said central wall on said body frame (9) at the rear of the bonnet, whereby said central wall (1) covers the upper part of a clutch housing by a lower portion of said central wall (1),
   and a handle part (7) mounted through said central wall.

2. For use in a vehicle having a bonnet enclosing the engine for driving the vehicle wherein the engine is located forwardly of the steering wheel shaft comprising
   a steering post mounting device including a housing (1) having opposed rearwardly projecting spaced apart side portions (2—2) interconnected by central wall portion defining a mounting seat (5),
   laterally extending side and top flanges 11, 12, 13 connected to said spaced apart side portions (2—2),
   and a laterally extending mounting flange 10, 10 connected at the bottom of said side portions (2—2),
   a frame (9,9) to which said mounting flanges are secured,
   a handle post mount (4) connected to said mounting seat (5),
   said handle post mount (4) including a support cylinder 37 for receiving a steering shaft 7,
   a meter panel frame 14 connected to said side flanges 11, 12 to the rear thereof,
   and a hood having an inner peripheral portion 21, 22, 23 circumscribing the periphery of said side and top flanges 11, 12 and 13, and
   sealing means 17, 18, 19 interposed between the inner periphery (21, 22, 23) of said hood (20) and the outer periphery of said side and top flanges (11, 12 and 13).

3. The invention as defined in claim 2, wherein said sealing means comprises an elongated rubber-like seal having opposed grooves 17a, b; 18a, b; 19(a) (b) for receiving the outer periphery of said top and side flanges and the inner periphery of said hood (20) respectively.

* * * * *